Figure 1:
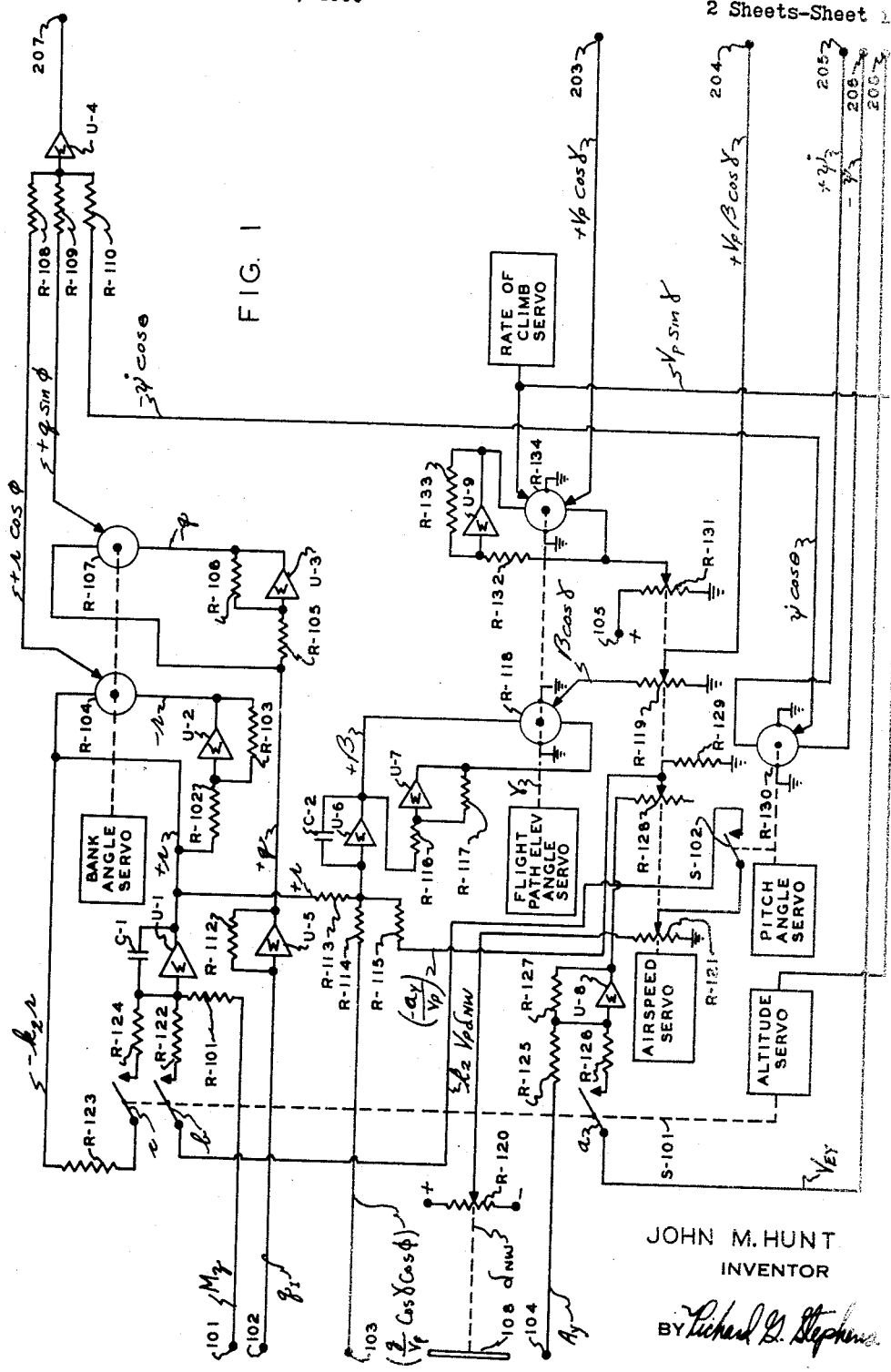

Nov. 8, 1960

J. M. HUNT 2,958,955

GROUNDED FLIGHT TRAINER

Original Filed Dec. 8, 1955

2 Sheets-Sheet 1

JOHN M. HUNT
INVENTOR

ATTORNEY

Nov. 8, 1960  J. M. HUNT  2,958,955
GROUNDED FLIGHT TRAINER
Original Filed Dec. 8, 1955  2 Sheets-Sheet 2

JOHN M. HUNT
INVENTOR

BY Richard D. Stephens
ATTORNEY

United States Patent Office 2,958,955
Patented Nov. 8, 1960

2,958,955
GROUNDED FLIGHT TRAINER
John M. Hunt, Palo Alto, Calif., assignor to General Precision, Inc., Wilmington, Del., a corporation of Delaware Continuation of application Ser. No. 551,778, Dec. 8, 1955. This application Nov. 25, 1959, Ser. No. 856,638

6 Claims. (Cl. 35—12)

My invention relates to grounded training equipment, and more specifically to an improved grounded flight trainer or simulator. Most contemporary flight simulators introduce a number of rather serious approximations in simulating the operation of an aircraft during take-off and landing. Since the most important aspects of flight training occur during simulated airborne conditions rather than during simulated grounded conditions, prior art simulators have utilized computers which compute aircraft motion with respect to an air mass, since such computations are much simpler than computing simulated aircraft motion with respect to the earth. When the simulated aircraft became "airborne," prior art simulators commonly introduced simulated wind velocity to affect the position of a recording pen indicating aircraft ground track, usually by adding wind velocity component potentials to aircraft velocity component potentials in accordance with standard analogue computer technique. Such systems, however, considered the effect of "wind" only so far as it affected the simulated aircraft position after a period of airborne flight. In order to obviate the anomaly of a simulated wind "blowing" the simulated aircraft across the map while it was supposedly parked on the ground, most prior art simulators contained relays or switches responsive to simulated flight altitude to disconnect and render inoperative any simulated wind potential when the simulated aircraft was on the ground. It will be apparent that such prior art simulation of the effects of wind on aircraft operation was undesirably incomplete. Some important aspects of aircraft operation which were totally neglected were (1) the effect of wind on landing and take-off velocities, and (2) the effect of cross-winds on proper aircraft attitude during landings and immediately after take-off. Furthermore, an increasing number of flight trainers are incorporating visual displays in order to furnish instruction in contact flight as well as instrument flight. To properly operate visual display apparatus during simulated "on-ground" conditions as well as during simulated "in-flight" conditions, potentials or other computing quantities which are responsive to aircraft velocity or position are required at all times. Inasmuch as prior art simulators did not attempt the simulation of wind during "on ground" conditions, the velocity or position output quantities from such trainers are not suitable for operating visual display apparatus. If the velocity or position output quantities from such trainers are utilized to control visual display apparatus, sudden and unrealistic accelerations or decelerations will result as the simulated aircraft takes-off or touches down.

Application Serial No. 477,741 filed December 27, 1954 by Laurence E. Fogarty now Patent No. 2,925,667, for "Aircraft Trainer Apparatus," which is assigned to the assignee of the instant case, illustrates means by which all of the aforementioned problems may be overcome. Means are provided by which aircraft operation may be faithfully simulated during all normal phases, from a simulated parked condition through simulated takeoff, flight, landing and the final roll to a stop, with the effects of wind accurately taken into account during the entire operation. Unfortunately, however, the Fogarty system requires a considerable amount of additional computing apparatus, some of which serves practically little purpose except during ground-to-air transitions and vice versa. Furthermore, the addition of the extra equipment utilized in the Fogarty invention introduces the inherent analog computer imperfections (such as backlash, hysteresis, resolution errors, etc.) into the flight computations, sometimes resulting in unsatisfactory accuracy during "in-flight" operations.

Since the most important aspects of flight simulator operation occur during simulated flight rather than during simulated "on ground" conditions, the present invention makes all flight computations with respect to the air mass in an essentially conventional manner rather than making some computations with respect to earth as in the Fogarty invention. By deriving and applying a number of corrective terms during ground-to-air or air-to-ground transition, I have provided a system which faithfully simulates almost all phases of aircraft operation and which is comparatively simple, inexpensive, and capable of ready addition to prior art simulators and trainers.

It is therefore a primary object of the invention to provide improved grounded flight training apparatus capable of simulating ground/air transition.

It is an additional object of the invention to provide improved grounded flight training apparatus for simulating landings and takeoffs as well as ordinary flight which can be economically constructed.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

Figure 2:
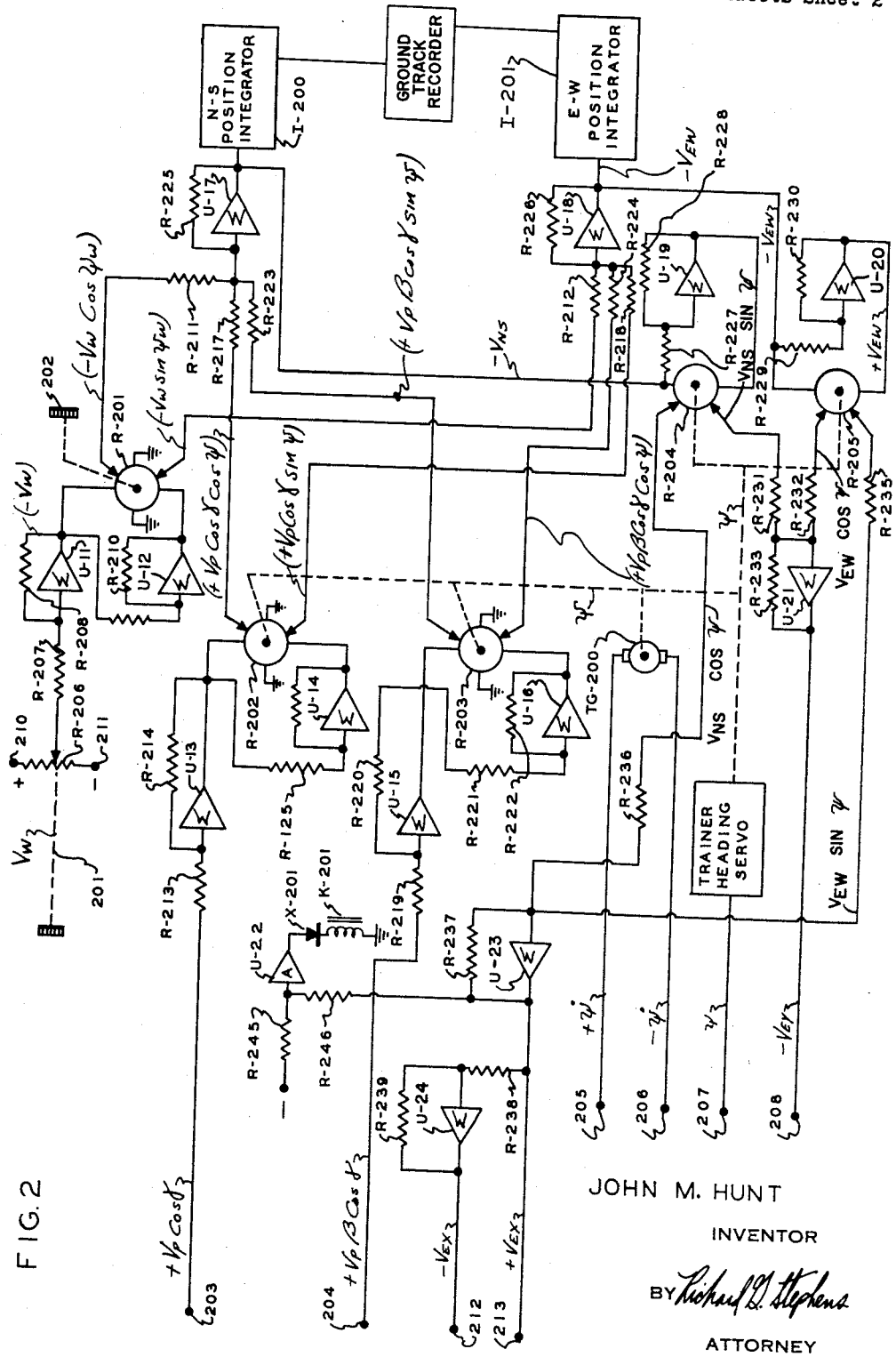

For a fuller understanding of the nature and objects of the invention reference should be had to the following detailed description taken in connection with the accompanying drawings, in which:

Figs. 1 and 2 are each electrical schematic diagrams illustrating an exemplary embodiment of the invention. In each of the figures, well-known parts are shown in block diagram form for sake of clarity.

In order not to obscure the invention with unnecessary details, many of the conventional portions of a typical electronic flight simulator are not shown, and only those portions which should be altered in practising the invention are shown in detail. Referring to Fig. 1, assume that a potential $M_z$ proportional to the aerodynamic yaw moments or angular acceleration is derived in conventional manner elsewhere in the simulator and applied via terminal 101 and scaling resistor R–101 to the input circuit of an integrator U–1. Derivation of aerodynamic yaw moments or angular acceleration is shown in considerable detail in Fig. 6 of the abovementioned Fogarty application. Important quantities usually utilized in deriving such potentials are (1) a potential commensurate with yaw moment due to rudder deflection, (2) a potential commensurate with yaw moment due to sideslip angle, and (3) a potential commensurate with yaw moment due to aileron deflection. The potential due to sideslip angle has particular significance in connection with the present invention, as will become apparent as the description proceeds. Integrator U–1 is shown as comprising a conventional electronic integrator having a capacitor C–1 in its feedback circuit, but it will be apparent that a velocity servo may be substituted in embodiments utilizing alternating current carrier. The potential output from integrator U–1 is commensurate with the time integral of simulated yawing acceleration, and hence is proportional to $r$, simulated yawing velocity. When the simulated aircraft touches down, contacts $b$ and $c$ of altitude switch S-101 apply further potentials to integrator U-1 via scaling resistors R-122 and R-124. These potentials are commensurate with certain wheel or ground force effects as will be explained below. Each of the aerodynamic phenomena described herein and the mathematical formulas used in deriving conventional grounded trainer potentials are shown and described in the abovementioned Fogarty application to which reference may be had. Standard NACA terminology is used for the aerodynamic quantities mentioned.

A potential proportional to simulated aircraft pitching rate $q_1$ derived elsewhere in the trainer in conventional manner is applied via terminal 102 and feedback amplifier U-5, having feedback resistor R-112, to excite bank angle resolver R-107. Feedback amplifier U-3, which is provided with input resistor R-105 and feedback resistor R-106, merely provides the polarity reversal necessary to excite resolver R-107 properly. The yawing rate potential $r$ from the output of integrator U-1, is applied directly and via amplifier U-2, which is provided with input resistance R-102 and feedback resistance R-103, to excite bank angle resolver R-104. Bank angle resolvers R-104 and R-107 are each positioned in accordance with simulated bank angle $\phi$ by the conventional grounded trainer bank angle servo shown in block form. The $r \cos \phi$ potential from the cosine wiper of resolver R-104 is applied via scaling resistance R-108 to summing amplifier U-4, and the $q_1 \sin \phi$ potential from the sine wiper of resolver R-107 is applied to amplifier U-4 via summing resistance R-109. A negative "rate of change of heading times cosine of pitch angle" or $-\dot{\psi} \cos \theta$ potential derived as will be explained below is applied to summing amplifier U-4 via summing resistor R-110. The resultant of these potentials is amplified in amplifier U-4 and applied via terminal 207 to a conventional velocity servo, the trainer heading servo (see Fig. 2). A differentiating device shown as comprising a tachometer generator TG-200 operated by the output shaft of the trainer heading servo derives positive and negative voltages proportional to $\dot{\psi}$ (rate of change of heading), which are applied via terminals 205 and 206 to excite pitch angle or $\theta$ resolver R-130 (see Fig. 1). The cosine wiper of resolver R-130 applies the $\dot{\psi} \cos \theta$ potential to amplifier U-4 via resistor R-110 as described above. It will be seen that the heading servo will continue to rotate until the resultant input and output of amplifier U-4 become zero. Since aircraft rate of change of heading $$\dot{\psi} = \frac{q_1 \sin \phi + r \cos \phi}{\cos \theta}$$

it will be seen that the shaft position of the heading servo will represent simulated aircraft heading. The heading servo shown in Fig. 2 in block form positions the shafts of a number of resolvers for purposes which will be described below.

A potential proportional to the component of aircraft weight acting laterally to the flight path, commonly written $$\left( -\frac{g}{V_p} \cos \gamma \cos \phi \right)$$

derived elsewhere in the trainer in conventional manner is applied via terminal 103 and scaling resistor R-114 to the input circuit of integrator U-6. $V_p$ and $g$ represent simulated true airspeed and the gravitational acceleration constant, respectively. A potential ($A_y$) proportional to aerodynamic side forces acting on the simulated aircraft is derived elsewhere in the trainer in conventional manner and applied via terminal 104 and resistor R-125 to the input circuit of amplifier U-8, which is provided with feedback resistor R-127. The output potential from amplifier U-8 is applied to excite potentiometer R-128, the arm of which is positioned by the trainer airspeed servo. The potential derived across fixed resistance R-129 and applied to integrator U-6 via scaling resistor R-115 will be seen to be proportional to $A_y/V_p$.

Rate of change $\dot{\beta}$ of aircraft slip angle $\beta$ may be expressed as follows:

$$\dot{\beta} = \left( \frac{g \cos \gamma \cos \phi + A_y}{V_p} - r \right)$$

A yawing rate potential derived as explained above is applied to the input circuit of integrator U-6 via summing resistor R-113. C-2 represents the conventional feedback capacitor of integrator U-6. It will be seen that the resultant input applied to integrator U-6 is equal to $\dot{\beta}$ as expressed above, so that the time integral output potential of integrator U-6 is commensurate with simulated slip angle $\beta$. The $\beta$ potential is applied directly and through inverting amplifier U-7, which is provided with input resistor R-116 and feedback resistor R-117, to excite resolver R-118, the arm of which is positioned by the conventional grounded trainer flight path elevation angle or $\gamma$ servo. The $\beta \cos \gamma$ potential on the cosine wiper of resolver R-118 is applied to excite potentiometer R-119, the arm of which is positioned by the trainer airspeed servo, deriving a $V_p \beta \cos \gamma$ potential for application via terminal 204 to the apparatus shown in Fig. 2. Since sideslip angle $\beta$ is maintained at small angles during normal flight, the $V_p \beta \cos \gamma$ quantity will approximate closely the quantity ($V_p \cos \gamma \sin \beta$) which is theoretically more correct. If desired, a conventional servo (not shown) positioned in accordance with the $\beta$ output from integrator U-6 may be used to position a resolver (not shown) to derive the quantity in a more accurate manner. Potentiometer R-131 is excited with a constant potential from the computer power supply via terminal 105, and its arm is positioned by the trainer airspeed servo, deriving a $V_p$ potential which is applied directly and via amplifier U-9, which is provided with input resistor R-132 and feedback resistor R-133, to excite elevation angle resolver R-134. The conventional trainer airspeed servo provides a shaft output commensurate with trainer airspeed in the absence of any wind. The $V_p \cos \gamma$ potential derived on the cosine arm of resolver R-134 is commensurate with the horizontal component of airspeed, and this potential is applied via terminal 203 to the apparatus shown in Fig. 2. The $V_p \sin \gamma$ potential appearing on the sine arm of resolver R-134 may be used to position a conventional trainer rate of climb servo (through a time-lag device, if desired), and also may be applied to be integrated by the trainer altitude servo to provide a shaft position commensurate with simulated altitude.

Referring now to Fig. 2, the $V_p \cos \gamma$ or horizontal component of airspeed potential on terminal 203 is applied via buffer amplifier U-13, which is provided with input resistor R-213 and feedback resistor R-214, and inversion amplifier U-14, which is provided with input resistor R-125, to excite heading resolver R-202, providing $V_p \cos \gamma \cos \psi$ and $V_p \cos \gamma \sin \psi$ potentials on the arms of resolver R-202. These potentials are commensurate with components in first and second reference directions of the component of velocity of the simulated aircraft in the direction in which it is pointing, with the effects of wind excluded. Inasmuch as presence of a sideslip angle will cause an airplane to travel in a resultant direction other than that in which it is pointing, even in the absence of a wind, component correction potentials varying in accordance with simulated sideslip angle $\beta$ are derived by resolver R-203. When added to the output potentials from resolver R-202, the correction potentials from resolver R-203 provide resultant potentials closely approximating the components of aircraft total velocity with respect to still air, in the first and second perpendicular reference directions. The $V_p \beta \cos \gamma$ potential applied via terminal 204 is applied via buffer amplifier U–15, which is provided with input resistor R–219 and feedback resistor R–220, and inversion amplifier U–16, which is provided with input resistor R–221 and feedback resistor R–222, to excite heading resolver R–203, providing ($V_p \beta \cos \gamma \sin \psi$) and ($V_p \beta \cos \gamma \cos \psi$) potentials. As mentioned above, the proper theoretical value of the potential at terminal 204 should be $V_p \sin \beta \cos \gamma$. More theoretically proper quantities required for addition to the outputs of resolver R–202 are $V_p \cos \gamma \sin \psi \sin \beta$ and $-V_p \sin \beta \cos \gamma \cos \psi$. It will be seen that if sideslip angle is maintained small, that $\cos \beta$ and $\sin \beta$ may be approximated by unity and $\beta$ with very small error. The $V_p \cos \gamma \cos \psi$ potential from resolver R–202 and its correction potential $V_p \beta \cos \gamma \sin \psi$ together constitute a quantity commensurate with simulated velocity in a first reference direction, which is commonly designated "North-South" direction. This quantity is applied via summing resistors R–217 and R–223 to the input circuit of summing amplifier U–17, which is provided with feedback resistor R–125. The $V_p \cos \gamma \sin \psi$ potential from resolver R–202 and its correction potential $V_p \beta \cos \gamma \cos \psi$ together constitute a quantity commensurate with simulated velocity in a second reference direction commonly designated "East-West" direction. This quantity is applied via summing resistors R–224 and R–218 to summing amplifier U–18, which is provided with feedback resistor R–126.

Since the N—S and E—W velocity potentials have been derived proportional to airspeed in the absence of wind it will be apparent that they represent simulated velocity of the aircraft with respect to the relative air mass. It will be apparent that vector addition of components of N—S and E—W velocities of the air mass with respect to the earth will provide quantities commensurate with simulated aircraft velocities with respect to the earth while the simulated aircraft is airborne. Potentiometer R–206 is excited via terminals 210 and 211 with constant potentials from the trainer power supply, and its wiper arm shaft 201 is manually positionable by the instructor in accordance with a simulated wind velocity $V_w$. The $V_w$ potential derived is applied via buffer amplifier U–11, which is provided with input resistor R–207 and feedback resistor R–208, and inversion amplifier U–12, which is provided with feedback resistor R–210, to excite wind direction resolver R–201, the arms of which are manually positionable by means of wind direction control knob 202, in accordance with a desired simulated wind direction to drive $V_w \cos \varphi_w$ and $V_w \sin \varphi_w$ potentials proportional to components of wind velocity in "northerly" and "easterly" directions. These potentials are applied to summing amplifiers U–17 and U–18, via summing resistors R–211 and R–212, to provide potential outputs from those amplifiers commensurate with simulated aircraft velocities with respect to the earth. The northerly velocity potential $V_{ns}$ may be applied to a conventional integrator I–200 (such as a velocity servo, for example) to provide a shaft output commensurate with simulated aircraft position in a North-South direction. The easterly velocity potential $V_{EW}$ may be applied to a similar integrator I–201 to provide a shaft output commensurate with simulated aircraft position in an East-West direction. The shaft outputs from integrators I–200 and I–201 may be utilized in conventional manner to actuate position-indicating means shown in Fig. 2 in block form as a conventional ground track recorder to illustrate the ground track of simulated flight, and the outputs may also be used to actuate simulated radio aids equipment and visual display apparatus. Since the wind inputs from resolver R–201 are connected into the system both during and after a takeoff or landing no unrealistic change in simulated aircraft velocity will occur as the simulated aircraft takes off or lands.

The N–S velocity potential output $V_{NS}$ of summing amplifier U–17 is applied, directly and via inversion amplifier U–19, which is provided with input resistor R–227 and feedback resistor R–228, to excite heading resolver R–204, deriving a potential $V_{NS} \sin \psi$ proportional to the component of North-South velocity which is sidewise, or perpendicular to the direction of aircraft heading. The E—W velocity potential output $V_{EW}$ of summing amplifier U–18 is applied directly and through inversion amplifier U–20, which is provided with input resistor R–229 and feedback resistor R–230, to excite heading resolver R–205, providing a potential $V_{EW} \cos \psi$ proportional to the component of East-West velocity which is in a direction sidewise relative to the simulated aircraft. The two sidewise component potentials are applied via summing resistors R–231 and R–232 to be summed in amplifier U–21, which is provided with feedback resistance R–233, to provide a $V_{EY}$ potential proportional to the lateral (normal to heading) velocity of the aircraft with respect to the earth. This lateral velocity potential is applied via terminal 208 (see Fig. 1) to contact $a$ of altitude switch S–101. An airborne aircraft may travel through the air with a sidewise velocity with respect to the earth, but as soon as the aircraft landing gear touches down any sidewise velocity is abruptly terminated, unless, of course, the aircraft landing gear is the somewhat rare pivoting caster type. As the simulated aircraft reaches zero altitude, the shaft of the conventional altitude servo closes contact $a$ of altitude switch S–101, applying the sidewise ground velocity potential $V_{EY}$ via summing resistor R–126 to be summed with the aerodynamic side force potential applied via terminal 104. The total side force potential output from summing amplifier U–8 is thereby changed, altering the computed sideslip angle, since integrator U–6, which is used to compute sideslip angle $\beta$ is responsive to the potential applied from amplifier U–8 via resistor R–115. The sideslip angle will be forced to change until the $V_{EY}$ potential becomes zero, or in other words, until the simulated velocity of the aircraft contains no component perpendicular to aircraft heading. Since the $V_{EY}$ potential, which may be termed a "forcing potential," may be amplified and applied to summing amplifier U–8 with considerable magnitude, the simulated sidewise velocity may be forced to zero rapidly, in the same manner as in an actual aircraft. The $V_{NS} \cos \psi$ potential proportional to the longitudinal component of N—S velocity from resolver R–204 and the $V_{EW} \sin \psi$ potential proportional to the longitudinal component of E—W velocity are applied through summing resistors R–235 and R–236 to summing amplifier U–23, which is provided with feedback resistor R–237 to provide an output potential $V_{EX}$ proportional to the longitudinal velocity of the aircraft. This potential is inverted in polarity by amplifier U–24, which is provided with input resistor R–238 and feedback resistor R–239, and hence positive and negative potentials proportional to aircraft ground speed are made available at terminals 212 and 213.

Closure of altitude switch S–101 when the simulated aircraft is on the ground also applies a potential $k_2 r$ proportional to rate of turn $r$ times a scaling constant $k_2$ via contact $c$ and resistors R–123 and R–124 as an added yaw acceleration, altering the rate of turn output from integrator U–1, and thereby altering the computed values of simulated heading and simulated sideslip angle. By this means the simulated aircraft heading is constrained to follow the simulated aircraft path during grounded travel.

Closure of contact $b$ of altitude switch S–101 prepares a circuit to apply a turning moment potential to yawing moments integrator U–1. Potentiometer R–120 is excited by constant potentials from the computer power supply, and its wiper arm is positioned by the student pilot by turning a simulated nose-wheel steering control 108. The turning of the simulated nose wheel through an angle $\delta_{nw}$ derives a potential which is modified in accordance with airspeed by potentiometer R–121, deriving a $\delta_{nw} V_p$ potential which is routed to amplifier U–1 via pitch angle switch S-102. The conventional trainer pitch angle servo is provided with a cam (not shown) on its output shaft to close switch S-102 at all times when the simulated aircraft is pitched forward enough to allow its nose wheel to contact the ground to steer the aircraft. If desired, a simulated differential braking steering system such as shown in the Fogarty application could be substituted. The $\delta_{nw} V_p$ potential applied to yaw moments integrator U-1 via resistor R-122 is substantially proportional to the turning moments required to turn the simulated aircraft at the rate dictated by the selected nose wheel deflection angle $\delta_{nw}$, so that the simulated aircraft rate of turn output $r$ from integrator U-1 is computed substantially in accordance with nose wheel steering. Theoretically, the turning moment is proportional to ground speed rather than airspeed, and, if desired one may provide an additional potential proportional to ground speed to make the computation. This could be done, for example, by eliminating airspeed potentiometer R-121 and by exciting nose wheel control potentiometer R-120 with the longitudinal ground velocity outputs of opposite polarity shown as derived and applied to terminals 212 and 213 in Fig. 2. When the simulated aircraft is "airborne," so that the contacts of switch S-101 are open, it will be seen that simulated turning rate $r$ is a function of the simulated yawing moments potential $M_z$, that simulated sideslip angle $\beta$ is a function of simulated aerodynamic side forces plus the lateral component of weight quantity at terminal 103 and simulated airspeed, and that simulated heading is a function of simulated rate of turn $r$, pitching rate $q$, pitch angle $\theta$, and bank angle $\phi$. It may also be understood that the direction of the simulated ground track indicated by the coordinate output quantities from position integrators I-200 and I-201 is dependent upon simulated heading angle $\psi$ and simulated sideslip angle $\beta$. It should be noted that during simulated airborne flight heading $\psi$ and sideslip angle $\beta$ affect the simulated ground track, but that conversely, the character of the ground track does not affect simulated heading $\psi$ nor sideslip angle $\beta$.

However, when altitude switch S-101 closes its contacts upon occurrence of a simulated touch-down, application of the lateral component of ground velocity potential $V_{EY}$, as explained above, forces the calculated value of sideslip angle to change so as to force the $V_{EY}$ quantity to zero, which means that the simulated ground track has been constrained to conform with the instantaneous computed value of simulated heading angle. As explained thus far, simulated heading will have remained the same, since the application of the $V_{EY}$ potential has no direct effect on the trainer heading servo. Closure of contact $b$ of switch S-101 applies a potential proportional to simulated nose wheel turning moment back to the input circuit of integrator U-1, which computes simulated rate of turn, and contact $c$ of switch S-101 applies a degenerative or damping potential commensurate with ground forces, such as wheel friction, which resist turning. The aerodynamic turning moments continue to be applied to integrator U-1 via terminal 101. It will be seen that these potentials applied to integrator U-1 represent the primary turning moments acting on the simulated aircraft, so integrator U-1 will provide a realistic rate of turn output potential. The rate of turn output potential will largely determine the instantaneous simulated heading angle $\psi$, because the components ($r \cos \phi$) of rate of change of heading $\psi$ are approximately equal to $r$ and zero during normal landings, since bank angle $\phi$ and pitching rate $q$ are normally very small or zero quantities during normal landings. Similarly, the rate of turn output potential applied to integrator U-6 will largely determine simulated sideslip angle, since the potentials applied to integrator U-6 via resistors R-114 and R-115 are normally small during normal simulated landing conditions. Since aircraft yawing moments obviously depend greatly upon sideslip angle, the aerodynamic yawing moments potential applied to integrator U-1 via terminal 101 will vary with the simulated sideslip angle output potential from integrator U-6, which, in turn, varies with the simulated rate of turn output potential from integrator U-1. Thus it will be seen that the recited interconnections between the rate of turn, sideslip angle and heading computers cause these computers to provide realistic output quantities.

To be theoretically rigorous, simulated airspeed $V_p$ should be constrained to equal simulated wind velocity $V_w$ vectorially during a simulated parked condition, and simulated ground speed $V_{EX}$ should be proportional to the vector resultant of such quantities during all phases of simulated flight. However, the simulation of aircraft operation at low ground speeds is of very limited training value, and the invention contemplates use of an approximation which considerably simplifies the apparatus. As power is applied to the apparatus to begin a simulated flight, simulated wind velocity potentials will be applied to summing amplifiers U-17 and U-18 (Fig. 2) providing an instantaneous simulated aircraft velocity in accordance with wind velocity. The instructor may correct such anomalous simulation by adjusting the wind velocity control knob to a low velocity or zero velocity position. As the simulated aircraft engines develop thrust and accelerate the simulated aircraft down the runway, simulated wind velocity may be gradually entered, up to the desired condition by adjusting shaft 201, but simulated wind velocity should be entered slowly enough so that it always remains a small fraction, for example, one-third or less, of trainer simulated airspeed. At zero ground speed, it will be seen that the "sideslip" angle of an actual aircraft depends upon the direction in which the wind is blowing, and hence a parked aircraft may have a sideslip angle anywhere between zero and 360 degrees. As the aircraft increases ground speed the sideslip angle decreases such that at or near normal takoff speeds the sideslip angle is always a low value, for example, less than ten degrees, since aircraft forward speed is normally great compared to the cross-wind component of wind velocity. Since simulation of low speed grounded travel is of little importance, $\beta$ integrator U-6 may be scaled so that its output potentials are limited in magnitude to relatively small angles, for example 15 degrees. If an electromechanical or mechanical integrator is utilized instead of electronic integrator U-6, mechanical limits may be used to prevent large simulated sideslip angles which could otherwise occur during simulated low speed or parked grounded conditions.

Assume that a simulated takeoff is to be made in a North direction with a simulated wind of 20 miles per hour blowing from the Northwest. If the instructor has adjusted wind velocity potentiometer R-206 to 20 miles per hour and wind direction knob 202 to Northwest when the simulator is turned on, the wind velocity potentials applied from resolver R-201 to the N—S and E—W position integrators will immediately cause such integrators to move, causing the anomalous effect of the simulated aircraft being blown backwards along the ground, as if the aircraft were parked on ice, for example. If the simulator heading is in a North direction, the simulated aircraft would immediately appear to be blown southerly at 20 cos 45° or 14 miles per hour. The $V_{EY}$ potential derived by resolver R-204 and R-205 would constrain lateral velocity to remain zero (East-West velocity in the situation being considered), since contact "$a$" of altitude switch S-101 would be closed. Therefore, as the simulator is turned on, the simulated aircraft would appear to be blown backward (or forward in the case of a simulated tail wind) in accordance with the fore-and-aft component of simulated wind velocity. If it is considered desirable to eliminate the anomalous effect, the instructor may wait until the student has started the simulated engines, and acquired a predetermined amount of forward speed before entering a simulated wind velocity on potentiometer R-206. If desired, automatic means responsive to simulated ground speed shown as comprising relay K–201 may be provided to disable the position integrators until simulated ground speed will become a predetermined amount in the forward direction. As will be recalled from the above description, the output of amplifier U–23 is a potential commensurate in polarity and magnitude with the direction and velocity of simulated longitudinal ground speed. If the simulated aircraft is being blown backwards as mentioned above, the output of amplifier U–23 will be negative. This negative potential is applied via summing resistor R–246 to be summed with fixed negative potential applied via resistor R–245 and applied via amplifier U–22 and rectifier X–201 to operate relay K–201. Contacts (not shown) of relay K–201 may disable or disconnect position integrators I–200 and I–201. As long as simulated aircraft longitudinal component of ground speed is backwards or less than a predetermined forward speed, the resultant input to amplifier U–22 will be negative, and the position integrators will remain disabled. However, as soon as the student has begun to taxi forward at a sufficient speed, the positive output from amplifier U–23 will override the fixed negative input, reversing the resultant input to amplifier U–22, causing relay K–201 to re-connect position integrators I–200 and I–201 for normal operation.

Assume that an extremely small negative biasing voltage is applied via resistor R–245, so that relay K–201 connects the position integrators to operate substantially at the instant any forward ground speed occurs. With the 20 mile per hour simulated wind mentioned above, forward speed with respect to ground will begin to occur as soon as the engines have accelerated the computed airspeed of the simulated aircraft enough to overcome the 14 miles per hour longitudinal component of wind. The time required to overcome the headwind will vary in the same manner as in an actual aircraft. At the moment when forward ground speed begins the conventional trainer airspeed servo will be in its 14 miles per hour position. As simulated acceleration continues the simulated aircraft velocity will increase and simulated position will change in a theoretically rigorous manner. Assume that the aircraft accelerates to a forward ground speed of 120 miles per hour during its takeoff run. The conventional trainer airspeed servo will move during such acceleration from its 14 miles per hour position to its 134 miles per hour position. It will be seen that the servo will be changing in accordance with the flow of air over the aircraft, from a 14 m.p.h. velocity due to headwind at standstill to the 134 m.p.h. velocity due to wind and ground velocity at the instant of takeoff. Since the airspeed servo accurately calculates the speed of the aircraft with respect to the air, the aerodynamic forces computed using the output of the airspeed servo will be correct during the takeoff run.

Continuing the above example, the Northwest wind will be seen to cause a sideslip angle of 45 degrees when the simulated aircraft is parked on the ground and until forward speed occurs. As forward speed increases the component of wind velocity across the aircraft remains the same, making sideslip angle decrease. At ground speeds during which nose-wheel steering is used, aircraft heading and direction of travel are dictated by the nose-wheel control. At higher ground speeds, as, for example, the final moments of a takeoff run, during which time the aircraft nose wheel is off the ground, the aerodynamic yaw moments caused by sidewise components of wind require that the pilot provide a compensating rudder deflection to maintain heading parallel with the runway. This effect is realistically simulated by the invention, since the student-pilot must maintain yaw moments equal to zero to prevent simulated change in heading. As soon as aircraft lift increases so as to cause an altitude, contact "a" of altitude switch S–101 opens, allowing simulated "drift" or lateral velocity and contact "c" of switch S–101 opens, allowing aircraft heading to depart from aircraft flight path direction so that the simulated aircraft will yaw slightly at takeoff if a cross-wind is present, requiring the same correction as in an actual aircraft. The simulation of the converse effects occurring during landing are believed to be apparent in view of this explanation. The transition from airborne flight to grounded travel will occur realistically during the entire landing and roll to a stop. Assuming that the simulated aircraft lands "up wind," it will roll to a stop when simulated airspeed decreases so as to equal the longitudinal headwind component, and the further decrease in computed airspeed as the engines are shut off will cause relay K–201 to disable the position integrators as the simulated wind attempts to blow the simulated aircraft backwards.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

This application is a continuation of my copending application, Serial No. 551,778, filed December 8, 1955, now abandoned.

Having described my invention, what I claim as new and desire to secure by Letters Patent is:

1. Grounded training apparatus for simulating the operation of an aircraft during a range of grounded travel, transition between grounded travel and airborne travel, and during airborne travel, comprising in combination, means for deriving a first potential commensurate with horizontal velocity of said aircraft with respect to a simulated relative air mass, second means for modifying said potential in accordance with simulated aircraft heading and simulated sideslip angle to provide second potentials commensurate with components of velocity of said aircraft along a pair of perpendicular reference axes, means for deriving third potentials commensurate with components of velocity of a simulated wind along said reference axes, means combining said second and third potentials to provide output potentials commensurate with simulated ground track velocities of said simulated aircraft, position indicating means operable by said output potentials to indicate the position of said aircraft, means for resolving said output potentials in accordance with the simulated heading to provide a forcing potential commensurate with simulated lateral velocity of said aircraft, and circuit means responsive to occurrence of simulated grounded travel for applying said forcing potential to said second means to force said forcing potential to become zero.

2. Grounded training apparatus for simulating the operation of an aircraft during a range of grounded travel, transition from grounded travel to airborne travel, and during airborne travel, comprising in combination, means for deriving a first potential commensurate with the horizontal velocity of said aircraft with respect to a simulated relative air mass, second means for modifying said potential in accordance with simulated aircraft heading and third means for further modifying said potential in accordance with simulated sideslip angle of said aircraft with respect to said relative air mass to provide second potentials commensurate with components of velocity of said aircraft along a pair of perpendicular reference axes, means for deriving third potentials commensurate with components of velocity of a simulated wind along said reference axes, means combining said second and third potentials to provide output potentials commensurate with components of velocity of said aircraft along said reference axes, position indicating means operable by said output potentials to indicate the position of said aircraft, means for resolving said output potentials in accordance with simulated heading to provide a forcing potential commensurate with velocity of said aircraft in a direction perpendicular to its heading direction, altitude means for deriving a potential commensurate with simulated altitude of said aircraft, and switch means responsive to said altitude means for applying said forcing potential to said third means upon occurrence of a simulated zero altitude condition.

3. Grounded training apparatus comprising in combination means for deriving a first potential commensurate with yawing forces on an aircraft, second means for integrating said potential to provide a second potential commensurate with yawing velocity of said aircraft, means for modifying said yawing velocity potential in accordance with simulated aircraft pitching rate, pitch angle and bank angle to provide a third potential commensurate with simulated rate of change of heading, velocity servo means responsive to said rate of change of heading potential to provide a simulated heading shaft output, means for deriving an airspeed potential commensurate with horizontal velocity of said aircraft with respect to a simulated relative air mass, resolver means operable by said shaft output for modifying said airspeed potential to provide a fourth potential, means for deriving a fifth potential commensurate with the component of aircraft weight acting laterally on said aircraft and inversely proportional to simulated airspeed, electrical means combining and integrating said second and fifth potentials to provide a sixth potential commensurate with simulated sideslip angle, means for modifying said sixth potential in accordance with simulated airspeed and simulated flight path elevation angle, to provide a seventh potential, resolver means connected to said heading shaft output to provide component potentials, summing means responsive to said component potentials for providing path velocity potentials commensurate with simulated velocity of said aircraft along a pair of perpendicular reference axes, means for deriving wind potentials commensurate with velocities of a simulated wind along said reference axes, means for combining said path velocity potentials and said wind potentials to provide output potentials commensurate with components of velocity of said simulated aircraft along said reference axes, resolver means operable by said shaft output and connected to said output potentials to provide a first forcing potential commensurate with velocity in a direction perpendicular to simulated heading, a simulated aircraft turning control, potentiometer means operable by said control for modifying said airspeed potential in accordance with the operation of said control to provide a second forcing potential, means responsive to simulated altitude for applying said first forcing potential to said electrical means, said second forcing potential to said second means and for applying a portion of said second potential degeneratively to said second means upon occurrence of a simulated zero altitude condition.

4. Grounded training apparatus for simulating the operation of an aircraft during grounded travel and through transition to and from airborne travel, comprising in combination; first computer means including an airspeed computer and a heading computer for deriving first potentials commensurate with velocity and direction of travel of said aircraft with respect to a simulated relative air mass; second computer means for deriving second potentials commensurate with the velocity and direction with respect to the earth of a simulated wind; circuit means continuously combining the aforesaid potentials during simulated ground travel, during simulated transition to airborne flight and during simulated airborne flight to provide output potentials commensurate with velocity and direction of said simulated aircraft with respect to the earth; resolver means responsive to said output potentials and said heading computer for deriving a further potential commensurate with simulated velocity of said simulated aircraft in a direction perpendicular to the simulated heading of said simulated aircraft; and a switching circuit responsive to occurrence of simulated grounded travel for applying said further potential to said first computer means in a degenerative sense, tending to force said further potential to become zero.

5. Grounded flight training apparatus for simulating the operation of an aircraft during grounded travel and through transition to and from airborne travel, comprising in combination: first computer means including an airspeed computer and a heading computer means for deriving first potentials commensurate with velocity and direction of travel of said aircraft with respect to a simulated relative air mass; said heading computer means including a rate of turn computer responsive to an input potential commensurate with simulated yawing accelerations and a sideslip angle computer operable to control said input potential; second computer means adjustable to derive second potentials commensurate with the velocity and direction with respect to the earth of a simulated wind; means for continuously vectorially combining said first and second potentials during both grounded and airborne simulated travel to provide output potentials substantially commensurate with simulated ground track velocities; means responsive to said heading computer means for resolving said output potentials to provide a third potential commensurate with simulated sidewise velocity of said simulated aircraft; ground position-indicating apparatus connected to be operated by said output potentials to indicate the simulated ground position of said simulated aircraft; means for providing a simulated altitude quantity; switching means responsive to said simulated altitude quantity and operable upon occurence of simulated ground altitude conditions for applying said third potential to said sideslip angle computer; a simulated steering control and means for deriving a fourth potential commensurate with the product of simulated aircraft velocity along its longitudinal axis and deflection of said steering control, said switching means being operable upon occurrence of simulated ground altitude conditions for applying said fourth potential to said rate of turn computer.

6. Grounded training apparatus for simulating the operation of an aircraft during grounded travel and through transition to and from airborne travel, comprising in combination: first computer means including an airspeed computer and a heading computer for deriving first potentials commensurate with velocity and direction of travel of said aircraft with respect to a simulated relative air mass; second computer means for deriving second potentials commensurate with the velocity and direction with respect to the earth of a simulated wind; circuit means continuously combining the aforesaid potentials during simulated ground travel, during simulated transition to airborne flight and during simulated airborne flight to provide output potentials commensurate with velocity and direction of said simulated aircraft with respect to the earth; resolver means responsive to said output potentials and said heading computer for deriving third and fourth potentials commensurate respectively with simulated velocity of said simulated aircraft in its simulated heading direction and simulated velocity in a direction perpendicular thereto; a switching circuit responsive to occurrence of simulated ground altitude for applying said fourth potential to said heading computer in a degenerative sense, tending to force said fourth potential to decrease; ground position indicating apparatus connected to be operated by said output potentials to indicate the simulated ground position of said simulated aircraft; and means responsive to said third potential for controlling operation of said ground position indicating apparatus.

References Cited in the file of this patent

UNITED STATES PATENTS

| | | |
|---|---|---|
| 2,529,468 | Dehmel | Nov. 7, 1950 |
| 2,731,737 | Stern | Jan. 24, 1956 |